United States Patent [19]
Beebe

[11] 3,787,803
[45] Jan. 22, 1974

[54] HIGH PERFORMANCE METER DEPTH SOUNDER FOR AUTOMATICALLY INDICATING DEPTH WITHOUT MANUAL ADJUSTMENT

[75] Inventor: John N. Beebe, Londonderry, N.H.

[73] Assignee: Raytheon Company, Lexington, Mass.

[22] Filed: Nov. 29, 1972

[21] Appl. No.: 310,300

[52] U.S. Cl. .............................................. 340/3 R
[51] Int. Cl. ............................................. G01s 9/68
[58] Field of Search ............... 340/1 R, 3 R; 343/7.3

[56] References Cited
UNITED STATES PATENTS
| 3,036,289 | 5/1962 | Beebe et al. | 340/3 R |
| 3,344,421 | 9/1967 | Dildy, Jr. | 343/7.3 |
| 3,500,302 | 3/1970 | Moss, Jr. et al. | 340/3 R |

Primary Examiner—Richard A. Farley
Attorney, Agent, or Firm—Herbert W. Arnold; Joseph D. Pannone; Harold A. Murphy

[57] ABSTRACT

A depth meter circuit which overcomes the usual necessity for manual adjustment of the sensitivity control to improve the signal-to-noise ratio and to prevent spurious meter response to wakes and debris at intermediate depths is achieved by a dynamically adjusted receiver attenuator circuit which is controlled by the combination of an automatic bottom tracking gate, a time varied sensitivity circuit and a transmission blanking circuit operating in conjunction with a meter indicating circuit which is activated only during the time of return echoes by means of a ramp voltage sampling circuit actuated only by the return echoes. The arrangement makes possible the use of maximum transmitted power for accurate measurement of deep bottoms and on the same nonlinear scale, provides accurate readings of shallow depths without manual adjustment.

15 Claims, 14 Drawing Figures

TIME BASE
SAW-TOOTH
FIG. 4A 62.5 MILLISECONDS = 150 FEET

TIME BASE
TRIGGER OUTPUT
FIG. 4B

TRANSMISSION

RECEIVER
FIG. 4C

90  ECHO 92  2nd ECHO 93

DETECTOR
FIG. 4D

FLIP-FLOP
FIG. 4E

FLIP-FLOP
TRIGGER OUTPUT
FIG. 4F

ECHO TIME

GATE PULSE
FIG. 4G

SAMPLING PULSE
FIG. 4H 2.0 Ms — 60.5 MILLISECONDS
300 MICROSECONDS

SAMPLING RAMP
FIG. 4I

SAMPLE

METER VOLTAGE
FIG. 4J

HIGH PERFORMANCE METER DEPTH SOUNDER FOR AUTOMATICALLY INDICATING DEPTH WITHOUT MANUAL ADJUSTMENT

BACKGROUND OF THE INVENTION

This invention relates in general to apparatus for determining the distance to a desired target such as the ocean bottom by measuring the elapsed time between the transmission of sonic wave energy toward a target and the reception of wave energy reflected from the target, and more particularly to an improved system of the meter indicating type which provides discrimination against unwanted targets such as fish and debris in the water and thermal gradients, and which prevents false indications, such as during loss of a bottom echo return or when the maximum depth of the depth sounder is exceeded.

In the past, depth sounders usually have measured or attempted to indicate an echo return from any object between the transducer and the bottom. In many instances, gain or amplification of the depth is initially set at a high sensitivity level to insure a return from a soft bottom which is sometimes too weak to receive at lower sensitivity settings. At such high gain setting, the meter needle of the depth indicator frequently travels back and forth between reading intermediate targets such as fish and debris, and then the bottom. Additionally, noise spikes, which occur as a result of high acoustical or electrical noise between the time of the transmitting pulse and reception of a bottom echo, also affect the accuracy of the meter reading, thus making it difficult, if not impossible, for the operator to obtain an accurate bottom reading. Accordingly, the operator of many presently known meter or digitally displayed depth sounding devices is required more or less continuously to adjust the sensitivity of the depth sounder in an effort to eliminate these undesirable targets and to maintain the optimum signal-to-noise ratio. In many instances, even this adjustment is insufficient to obtain a bottom echo reading, particularly when the bottom echo is weak in the presence of fish or debris above the bottom. Such normal adjustment of the depth sounder imposes a loss of valuable navigation time on the operator, particularly of craft traveling at speeds, for example, in excess of 25 knots in the presence of a rapidly changing depth, or in the presence of echoes reflected from wakes of other craft in the vicinity, in which instances, reading of the bottom echo is often entirely obscured by noise as well as by foreign objects in the water, regardless of the sensitivity setting. Also, as boats and marine craft become more numerous, faster and generally noisier at increased horsepower, the operator is forced to spend a greater proportion of navigation time in manual sensitivity adjustment to avoid such disturbances if indeed the depth indicator provides any meaningful indication at all. This is particularly true when an expanded scale is used to read shallow depths which often results in rapid oscillations of the meter between indicating, for example, a relatively shallow wake and the bottom echo, or incorrectly indicates a maximum depth during loss of bottom echoes.

A further problem is that many depth sounder units presently available make use of two range scales, one for shallow depths and one for deeper water, in order to obtain good depth resolution. The depth scales are manually switched, and while providing adequate depth resolution, the reading must be constantly watched while on the shallow scale, otherwise the depth reading may start over near zero when full scale reading is reached.

It is accordingly an important object of the invention to provide an improved depth sounder of the type which overcomes the aforesaid limitations of known apparatus and provides a continuous indication of bottom depth without manual adjustment.

It is a further object of the invention to provide a high accuracy depth sounder device which automatically discriminates against echoes from unwanted objects and which provides an accurate indication of bottom depth in the presence of higher noise backgrounds than heretofore, such as encountered on small high-powered pleasure boats common today or when navigating across turbulent propellor wakes.

Another object of the invention is to provide a relatively low cost, highly accurate device having automatic sensitivity control capable of accurately and clearly indicating echoes having a wide variety of return signal strengths due to varying reflection conditions and depth of the bottom without giving false indications of greater than actual depth.

A further object of the invention is to provide a depth meter having the above features operating in connection with a single expanded scale for simple and accurate reading of shallow depths, thus providing a meter indication that cannot be easily misread as when two depth scales are used.

SUMMARY OF THE INVENTION

According to the present invention, there is provided a depth sounder system for eliminating undesirable echo return signals emanating from other objects at an intermediate distance from the bottom of a body of water comprising a novel attenuation circuit connected in the receiving channel of a transmitting and receiving system, the output of which is coupled in circuit with a depth metering circuit. The attenuation circuit is adapted to operate in conjunction with a gating circuit connected at one imput thereto, herein referred to as a bottom tracking gate, which upon passage of a first echo through the attenuation circuit toward the depth meter circuit generates a gating pulse which actuates the attenuation circuit to block or attenuate echoes, such as from intermediate depths, for the duration of the transmit-receive period until a time shortly before the normal reoccurrence of the next bottom echo return, thereby eliminating undesirable echoes from foreign objects. The attenuation circuit also operates in conjunction with a variable gain control circuit connected to a second input thereto which circuit is actuated by a synch or time base pulse to provide a substantial decrease in attenuation of the attenuation circuit from the time of a first transmitting pulse to the time of a second transmitting pulse thereby effectively increasing the sensitivity of the receiver from the time of the first transmitting pulse to the start of the second transmitting pulse to insure reception of recurring bottom echoes even in the presence of noise. The novel attenuation circuit also includes at a third input thereto in the form of a blocking signal which is effective at the time of a transmitting pulse to block or attenuate the transmitting pulse and immediate ringing therefrom for a period slightly longer than the duration of the transmitting pulse to prevent amplification by the receiver of such ringing during the desired reception period, particularly in the presence of shallow depths when the transmitting pulse is within the "on" period of the bottom tracking gate. These three aforementioned inputs preferably are connected to a common attenuation circuit which, in the present embodiment, comprises a voltage divider circuit including a resistor and diode, the center point of which is connected to a subsequent impedance matching stage in the input of a following amplifier stage. During the time when the attenuation circuit is actuated by one or more of the three aforesaid input circuits, the diode portion of the voltage divider conducts in an amount depending upon the amount of control voltage applied by the combination of the three input control voltages to provide a variable amount of attenuation for overcoming the aforesaid problems relating to accurate indication of depth in the presence of noise and spurious echoes. This arrangement makes possible the use of substantially greater transmitter power than heretofore without the danger of echo returns from numerous undesired echo targets.

BRIEF DESCRIPTION OF THE DRAWINGS

For a better understanding of the present invention, together with other and further objects thereof, reference is made to the following description taken in connection with the accompanying drawings, in which.

DESCRIPTION OF THE PREFERRED EMBODIMENT

Figures 1, 2:
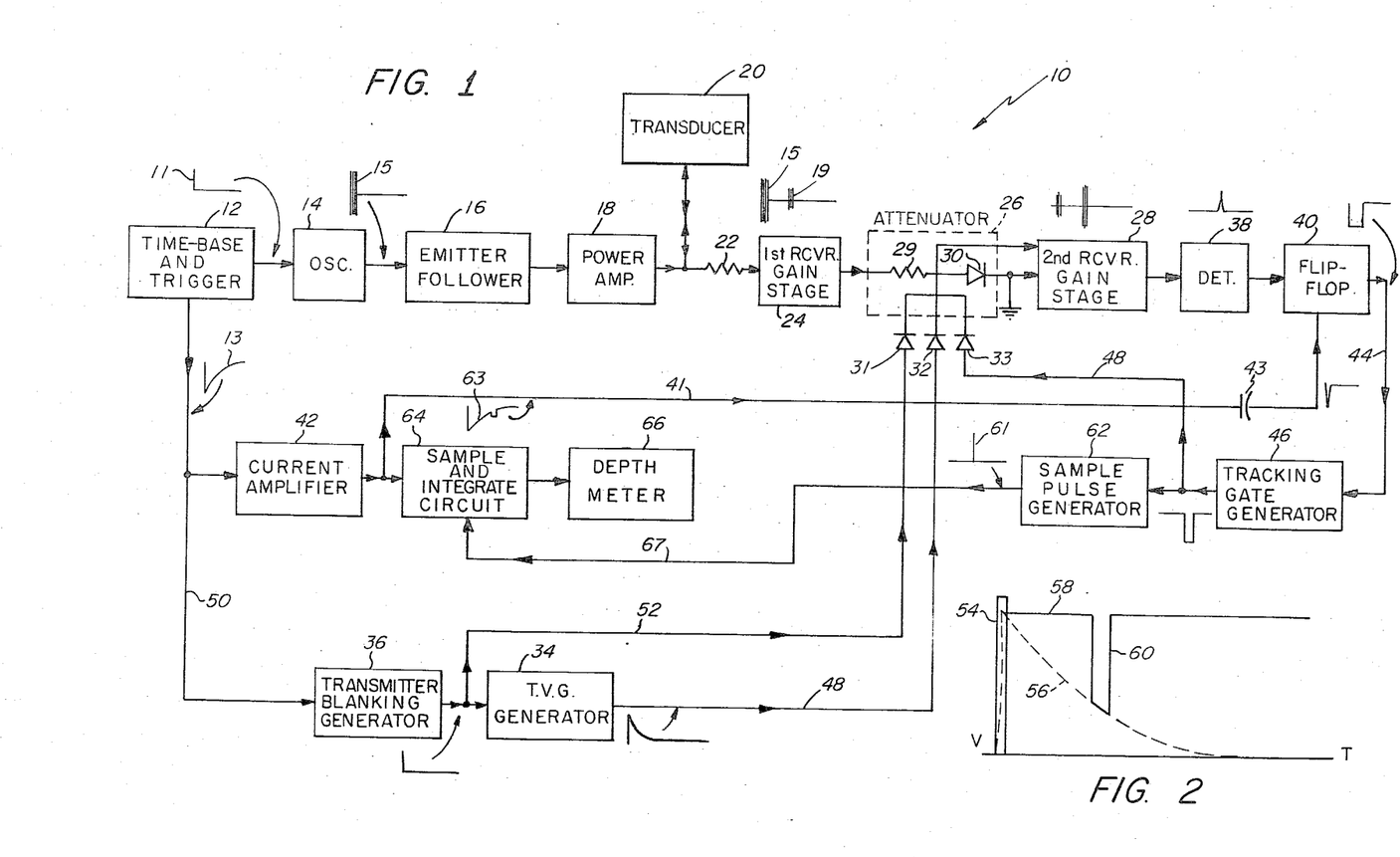
FIG. 1 is a block diagram of a depth sounder system embodying the principles of the invention.
FIG. 2 is a graph illustrating the operation of the attenuator circuitry of the block diagram of FIG. 1.

Referring now to FIG. 1, there is shown a meter type depth sounder system 10 which includes a source of a regularly recurring waveform to provide a time base and trigger source 12 through the use of a relaxation oscillator which provides a positive going trigger pulse 11 for the transmitter oscillator 14 at a repetition rate of, for example 62.5 milliseconds. This time duration is readily adjustable. A sawtooth ramp waveform 13 also generated in the time base and trigger source 12 is used for the metering circuitry and to feet the time varied gain, TVG, waveform generator as will be described. Transmitter oscillator 14 in this embodiment, is a conventional L-C oscillator which is normally cut off until a positive going trigger pulse is received from trigger source 12, at which time it oscillates at, for example, 415 kilohertz for a period of 80 microseconds as shown at waveform 15. The output of the transmitter oscillator is connected to a conventional emitter follower 16 which excites a class C power amplifier 1 and at the same time isolates power amplifier 18 from oscillator 14. Power amplifier 18 is normally at cutoff until the 415 kilohertz drive pulse is applied thereto and the amplified drive pulse is transmitted into the water by a conventional transducer 20.

A return echo 19 from transducer 20 is fed by way of current limiting resistor 22 to a first receiver RF gain stage 24 and then by way of a novel attenuator circuit 26 into a second receiver RF gain stage 28. The first receiver stage 24 operates at fixed gain, except for a small time varied gain action lasting a time equivalent to a few feet of depth at the time of the transmission pulse, resulting from the time constant of a bias filter circuit, not shown, included in the base of the amplifying transistor, as will be described. Thus, both the transmitted and received echo pulses pass through the first receiver RF stage without attenuation into the attenuator circuit 26. This circuit includes a voltage divider circuit comprising resistor 29 and diode 30, the midpoint of which is connected to the input of the second receiver RF gain stage 28. Included in the input circuit of the second receiver RF gain stage is an FET follower stage, not shown, which is fed directly from resistor 29. This resistor is, for example, 56 thousand ohms, to provide a high impedance source for the application of diode controlled gating and TVG application, which is applied directly to its input at the midpoint of the voltage divider circuit. The attenuator circuit 26 thus includes reception and simultaneous control of three separate input control voltages by way of individual diodes 31, 32 and 33 as will be described. The second receiver gain stage is therefore under control of the TVG and gating action that has been applied to the voltage divider circuit at the input of the FET follower stage, not shown, in the input of the second receiver gain stage. Thus, the output of the second receiver RF gain stage can be controlled by adjustment of the time varied gain voltage of a TVG generator 34 by way of diode 32, by the transmitting blanking voltage from transmitter blanking generator 36 by way of diode 31, and by a control voltage from a tracking gate generator 46 by way of diode 33. This latter generator, as will be described, is for the purpose of gating off the receiver at the reception of the first echo return and keeping it off until 2.0 milliseconds, for example, or 4.8 feet before the bottom echo from the next transmission is expected, thus preventing the reception of undesirable interference from intermediate depths.

The output of the second receiver gain stage is fed to a conventional detector, such as a diode detector 38 and the output of detector 38 is a positive going echo pulse. Connected to detector 38 is a conventional flip-flop circuit 40 which is triggered into one state by a strong negative going pulse by way of line 41, and conventional current amplifier 42 from the time base source 12. This negative going pulse on line 41 overrides any positive transmission pulse fed from the detector stage 38, at the same time. Thus, although the transmitter pulse from power amplifier 18 is attenuated in attenuator 26 and is not attenuated in the receiver gain stages, any remaining portion thereof is still overriden overrrridden the negative going output of current limiter 42, so that the flip-flop circuit 40 is triggered into one state. Flip-flop circuit 40 is then triggered to the opposite state by the positive going echo pulse received from detector 38. Thus, the circuit operates as a hard switch with its output going low at the time of transmission, and going high on reception of the first echo return. Any additional multiple echo returns or noise pulses before the next transmission can have no further effect on the circuit since when flip-flop 40 is triggered to the opposite state, further positive pulses can have no more effect on the flip-flop until it is again cut off at the next transmission by a negative pulse on line 41.

The negative square wave output from flip-flop circuit 40 is differentiated, resulting in a negative going short pulse at the time of transmission, which is clipped by a diode, not shown, and a short positive going pulse at the time of the first echo return that is applied by way of line 44 to trigger the tracking gate generator 46, which, in this embodiment is a one-shot multivibrator used for "bottom" gating of the receiver.

The bottom gate or tracking gate generator 46 is basically a high duty cycle one-shot multivibrator which is adjusted to operate with an "on" time of as much as 97 percent. Its purpose is thus for gating off the receiver at reception of the first echo return and keeping it off until approximately 2.0 milliseconds corresponding approximately to 4.8 feet of depth before the bottom echo from the next transmission is expected. When the transmission repetition rate has been set at, for example, 62.5 milliseconds, succeeding bottom echo returns will be very close to this distance apart. Thus, the period of the multivibrator in tracking gate generator 46, for example, is set for 60.5 milliseconds which is a duty cycle of nearly 96 percent. The one-shot pulse of the tracking gate generator therefore starts at the time of echo reception by a pulse from flip-flop 40 over line 44 and continues for 60.5 milliseconds, or 2.0 milliseconds less than the repetition rate of transmission. The 60.5 millisecond positive going square wave output pulse, representing receiver "off" time is applied by line 48 and diode 33 to the attenuator 26, holding the receiver off except during the relatively short period of 2.0 milliseconds, and thus avoiding undesirable echoes at intermediate ranges. If no echoes are received to provide a pulse on line 44, no gate is applied to line 48 and the attenuator is open during the entire duty cycle. The length of the 2.0 millisecond "on" gate can be adjusted in a well-known manner to the desired pulse length by adjustment of the bottom tracking gate multivibrator.

Another input voltage to attenuator 26 is from the time varied gain, TVG generator 34. In this instance, a ramp voltage is provided by way of line 48 and isolation diode 32 to vary the voltage input to the second receiver stage 28 so as to reduce the sensitivity at shallow ranges and gradually increase the sensitivity to maximum range. Inasmuch as the bottom tracking gate is effective only at depths greater than 4.8 feet, it is desirable to utilize the minimum receiver gain required for a given depth of water. This reduces the response of the system to wakes and debris in the water at shallow depths and increases the immunity of the equipment to ignition noise.

Attenuator circuit 26 also utilizes a gating circuit with a gate length of, for example, 225 microseconds which is used to greatly attenuate the transmission pulse and any strong transducer ringing during this time period. This short blanking pulse is generated in the transmitter blanking generator 36 in response to a negative going pulse by way of line 50 from time-base and trigger generator 12. The transmitter blanking pulse is a positive pulse which is applied to diode 30 in attenuator 26 by way of line 52 and isolation diode 31. The transmission pulse is attenuated by this gating pulse output from transmitter blanking generator 36 and its 225 microseconds in duration is shorter than the minimum range requirement for the depth sounder, and longer than the transmitted pulse.

Referring now to FIG. 2, there is shown a voltage versus time graph of the three positive control voltages which are combined and simultaneously applied to attenuator 26 and more specifically to diode 30. The first control voltage is the positive going 225 microsecond blanking pulse represented by waveform 54 of FIG. 2 applied to attenuator 26 by way of isolation diode 31. The time of 225 microseconds is equal to 0.54 feet of depth range which is well less than the minimum depth range of 1 foot, and over twice the length of the direct transmission.

The second positive control or bias voltage applied to attenuator 26 is the time-varied-gain ramp voltage represented by waveform 56 in dashed lines and starting at approximately the same time as blanking pulse 54. Briefly, this ramp voltage 56, which is applied by diode 32 to attenuator 26 starts positive at transmission time and decays with time, thus varying the attenuation with time from high at transmission time to very low at about maximum depth range.

The third input to attenuator 26 is a positive control voltage from tracking gate generator 46 by way of isolation diode 33. This positive voltage represented by the positive portion 58 of the waveform of FIG. 2 is cut off during the 2.0 millisecond portion of the tracking gate pulse represented by 60 of FIG. 2 and thus the tracking gate effectively provides high attenuation except during the negative gate period. During normal operation, this is at greater than very shallow depths, this positive voltage 58, as seen in FIG. 2, also provides the function of the transmitter blanking pulse 54 except when the gate pulse is present during transmission when in very shallow water, for example 3 feet, thus the transmitter blanking pulse by way of diode 31 is still required.

To provide even more gating attenuation than the approximate 65 db obtained by the above circuitry, the output of the bottom tracking gate is also preferably applied to the input of the second receiver gain stage 28 by way of an isolation diode, not shown, in FIG. 1. When the gate in attenuator 26 is not open, the bias of the second receiver gain stage is reduced by the loading of the circuitry connected to the associated isolation diode. When the gate is open, this isolation diode becomes biased into nonconduction and the loading is removed, thus permitting the input of the second receiver gain stage to go to normal bias for normal amplification.

Referring again to FIG. 1 the circuitry for providing a meter reading includes a sample pulse generator 62, sample and integrate circuit 64 and depth meter 66. The output from the tracking gate generator 46 in response to an output from flip-flop 40, representing the time of an echo return is fed in the form of a trigger pulse to sample pulse generator 62. A one-shot multivibrator, not shown, in sample pulse generator 62 is triggered to provide a 300 microsecond positive going sample pulse 61.

The depth measurement on depth meter 66 is made by sampling the value of the time base ramp voltage in sample and integrate circuit 64 at the time of the echo return and integrating the value of the short sample voltage at the ramp level to a direct current level, which is applied to the indiciating meter 66. In order to provide an expansion of the meter scale at shallow depths, the time base ramp voltage is in the form of an RC charge curve having approximately one time-constant equal to the repetition rate of the system, for example 62.5 milliseconds. The full scale meter reading at, for example 75 feet is equal to a one half time constant of 31.25 milliseconds. The meter scale is calibrated on this basis, and modified in a conventional manner over the first few feet to allow for the bottom of the ramp being above zero potential. This avoids the necessity of changing scales and yet provides accurate readings of shallow depths. The relatively high imedpance ramp voltage on line 50 from time base and trigger circuit 12 is fed through an input diode, not shown, to current amplifier 42 which, in the present embodiment, consists of a well-known Darlington emitter-follower to provide a low impedance source of the ramp voltage without appreciably loading the time base ramp generator 12. This source of low impedance ramp voltage is applied to sample and integrate circuit 64 which, except in the presence of a sampling pulse input on line 67, is cut off.

Thus, in operation, the 300 microsecond sample pulse 61, positioned as seen at waveform 63 on the voltage versus time ramp, switches on the sample and integrate circuit 64 at a level of ramp voltage depending on the distance up the ramp at which the return echo occurs. The sample voltage at this portion of the ramp is connected to charge an integrating capacitor to this level of ramp voltage only during the 300 microsecond sample period. When the integrating capacitor, not shown, has become charged by several echo returns to the direct current level of ramp voltage, representative of echo time, depth meter 66 is connected to measure this voltage and is calibrated to indicate the correct depth corresponding to the voltage measured. For example, a 200 mfd capacitor is connected to provide an integration of the sampled pulse to essentially a DC level. In this instance, the time constant of the sample and integrate circuit is, for example, approximately 640 milliseconds and the sample time is 300 microseconds. Since the depth meter is permitted to read the level of the ramp voltage only at the time of the sample, the meter returns to zero with the loss of echoes and thus can be said to fail safe rather than indicating maximum depth. Accordingly, this method of sampling a ramp voltage for meter measurements, rather than simply integrating the output of a flip-flop as frequently used heretofore, permits the meter to drop to zero in the absence of echo returns as well as permitting the use of a nonlinear scale on a relatively low cost linear meter movement by applying any desired portion of an exponential charge curve to a capacitor for the sample voltage. The transistor circuit herein is an improvement over the use of a nonlinear scale and its advantages as described in U.S. Pat. No. 3,036,289 of John N. Beebe et al and over the aforementioned fail safe principle as described in U.S. Pat. No. 2,502,938 of John N. Beebe. Another advantage of this type of measurement is that in shallow water where correct readings are most important, if a few echo returns are lost for any reason, the meter does not tend to be driven upward by the full output voltage from the flip-flop 40, and actually will only drop slightly in the "safe" direction of registering a more shallow depth. By utilizing the novel attenuator circuit and incorporating the aforesaid TVG, the fail safe principle, together with the use of a nonlinear scale and a bottom tracking gate, a depth sounder is provided which permits marine craft to accelerate to speeds of from zero to 25 to 35 knots and obtain an accurate depth reading from shallow to deep water without any adjustment as previously required for sensitivity or change of depth scales. For example, when the marine craft has traveled to a position where the depth range is beyond 150 feet, were it not for the time varied gain circuitry feeding attenuator 26, the depth sounder reading would of necessity start over again from zero. The depth of 150 feet represents the start of a new transmission cycle and the receiver gain is reduced beyond the point where echo returns from depths beyond approximately 200 feet are strong enough to trigger the metering circuitry. Also, by utilizing a relatively high frequency of 415 kilohertz, the attenuation in the medium beyond depths of approximately 200 feet is increased.

Figure 3A:
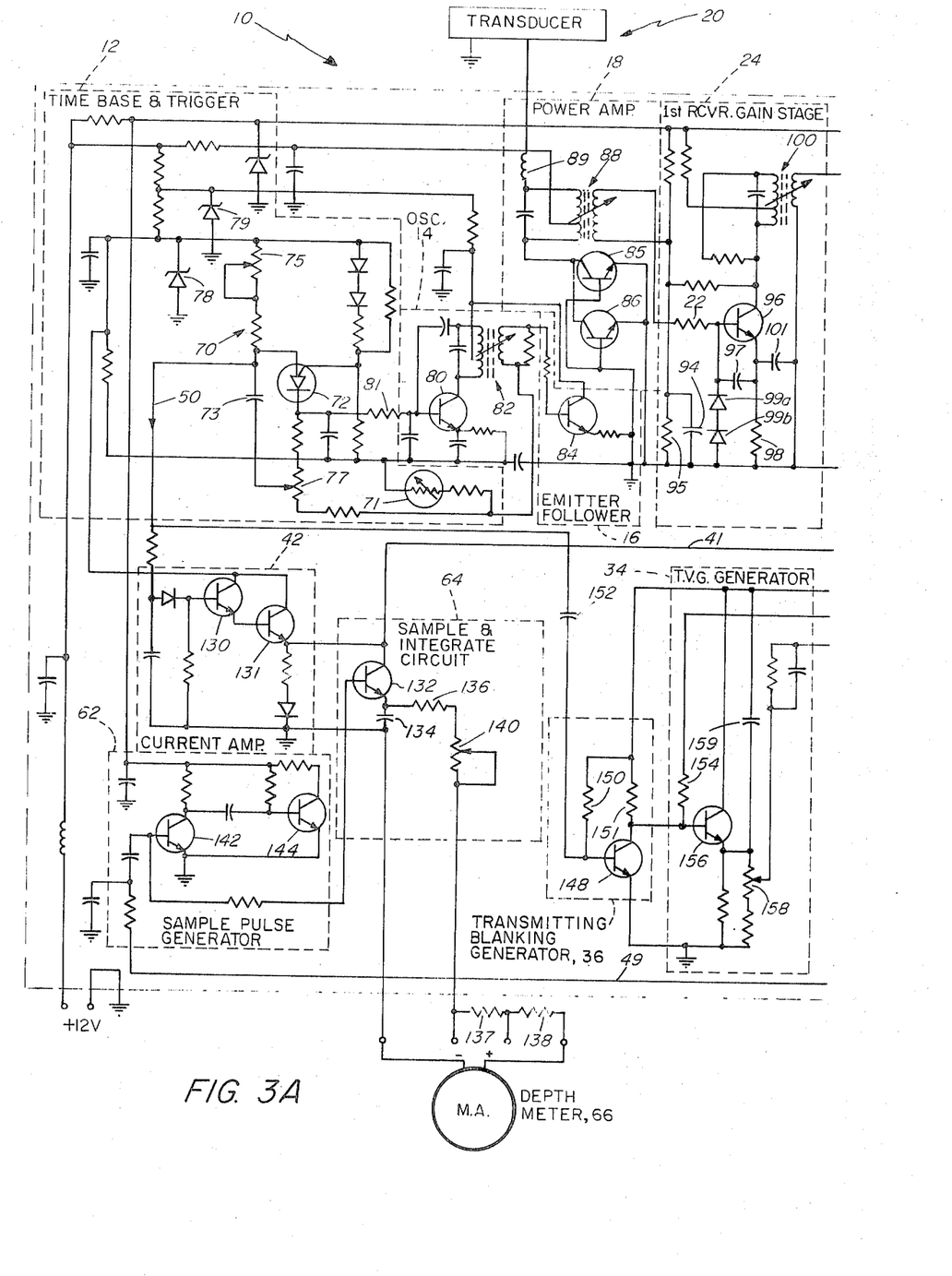
FIGS. 3A and 3B are a schematic circuit in accordance with the form of the invention shown in FIG. 1, but with added details.
Figure 3B:
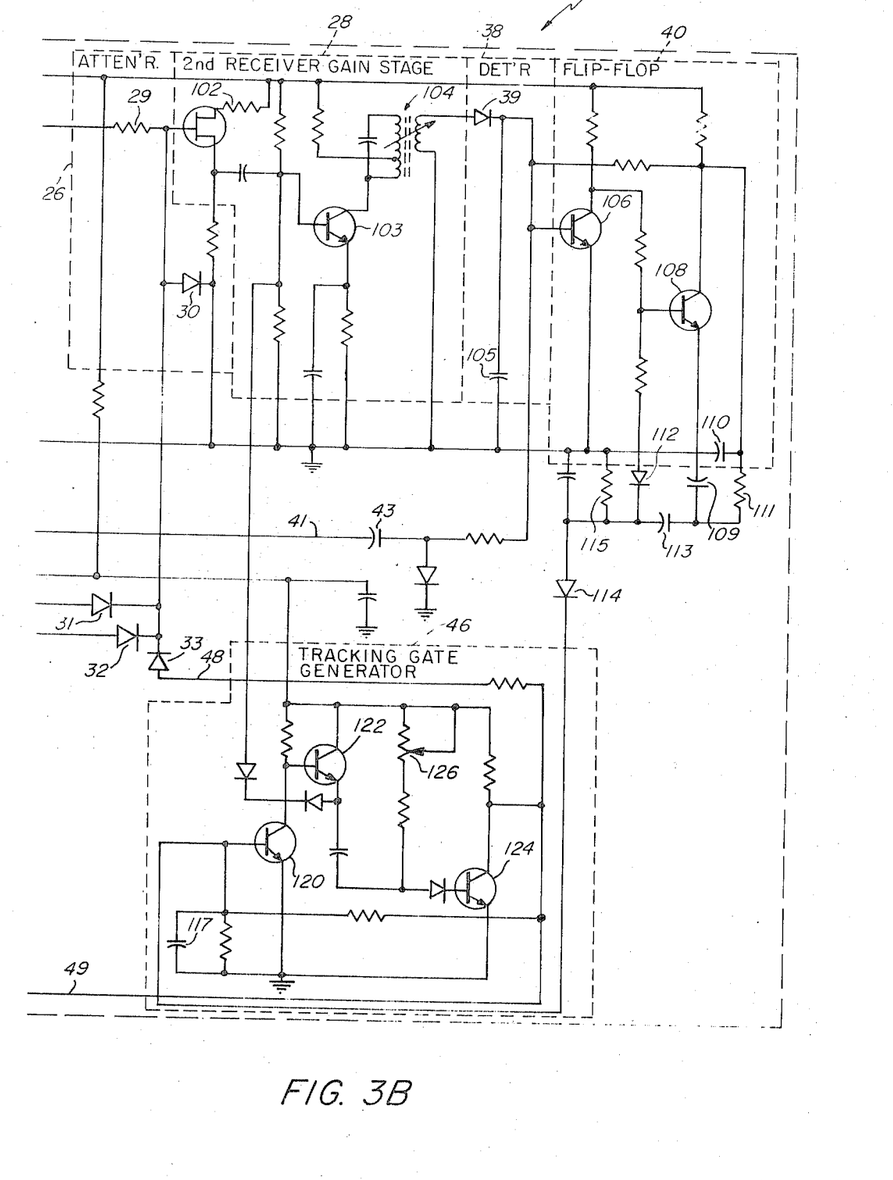

FIGS. 3A and 3B taken together make up a complete detailed schematic circuit of a depth sounder having the form of FIG. 1. In this figure the corresponding parts in FIG. 1 bear the same numbers. The circuit of FIGS. 3A and 3B taken with the above description of FIG. 1, provides additional circuit details relating to the time varied gain circuit, the time base and sampling ramp, and tracking gate here shown in complete form and described in detail in conjunction with attenuator 26. Basically the measurement function of FIGS. 3A and 3B is performed, as described in FIG. 1, by generating a sawtooth ramp voltage that starts at time of transmission and is sampled by a short gate pulse at the time of bottom echo return. In summary, briefly the short sample voltage taken from the ramp at the time of echo return is integrated essentially to a DC level by charging a large capacitor which after a number of transmission cycles nearly reaches the ramp voltage present at the time of sampling. The capacitor has a discharge path through a milliampere meter and series resistor to provide the proper time constant and direct current for the meter.

Figure 4A:
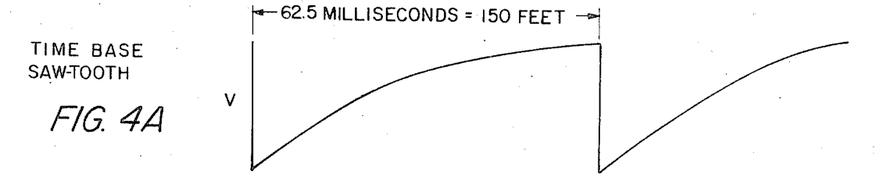
FIGS. 4A–J show the voltage versus time relationships which exist between a transmitted pulse, echo return signal and various timing waveforms at points throughout the circuit of FIGS. 3A and 3B.
Figure 4B:
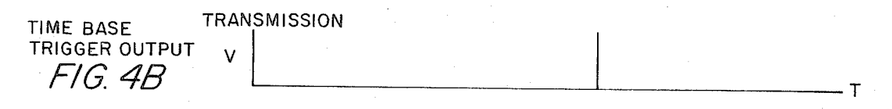

The transmitter and receiver shown in FIGS. 3A and 3B operate on a frequency of approximately 415 kilohertz with a transmitted pulse length of approximately 80 microseconds. To generate the transmitter pulse the time base and ramp generator circuit 12 is in the form of a sawtooth relaxation oscillator circuit 70 using a PUT programmable unijunction transistor 72 which generates the transmission repetition rate of 62.5 milliseconds and provides a positive going trigger pulse for the transmitter oscillator. FIG. 4A shows the waveform of the 62.5 millisecond pulse corresponding to 150 feet in depth. This sawtooth output is generated by the charge discharge on capacitor 73 and is fed by line 50 to amplifier 42 for the metering circuitry and to transmitter blanking generator 36 and time-varied gain waveform generator 34. The time base and ramp generator circuit has a trim potentiometer 75 for adjusting the sawtooth frequency accurately to 62.5 milliseconds and trim potentiometer 77 for varying the ramp voltage above ground in a well-known manner as compensation for variations in the valley point of individual unijunction transistors and thus providing a low meter adjustment. Zener diodes 78 and 79 and conventional associated circuitry provide well-known regulated bias voltage sources, respectively, for unijunction transistor 72 and transistor 80 in the transmitter-oscillator circuit. Unijunction transistor 72 also provides at its base a positive going trigger pulse, as shown at FIG. 4B, which occurs at the start of the sawtooth ramp and is fed by way of isolation resistor 81 to oscillator transistor 80 in oscillator 14.

Transmitter oscillator 14 is a conventional L-C oscillator circuit, tuned to 415 kilohertz by the slug in oscillation transformer 82. Transistor 80, which can be, for example, a type 2N2222 is normally cut off until a positive going trigger pulse is received from unijunction transistor 72 at which time it oscillates at 415 kilohertz for a period of about 80 microseconds. This pulse is fed by way of a conventional emitter follower 16 utilizing an emitter follower transistor 84 to provide isolation and a low impedance source of drive voltage for transmitter power amplifier 18. This amplifier includes a pair of transistors 85 and 86 in a conventional class C amplifier circuit which is normally cut off until a 415 kilohertz base drive pulse is received from the secondary of oscillation transformer 82. The collector circuit of amplifier transistors 85 and 86 is tuned to 415 kilohertz by means of a slug in output transformer 88. Transducer 20 is connected by way of a conventional high frequency noise filter choke 89 across the primary of output transformer 88, while the transformer secondary feeds the receiver.

Figure 4C:
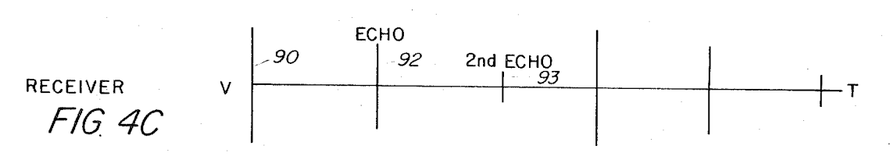

FIG. 4C shows the output transmission pulse 90, return echo 92 and double echo 93 at the input to the receiver by way of the secondary of the output transformer 88 and limiting resistor 22.

The receiver basically includes two tuned 415 kilohertz RF gain stages 24 and 28 with a novel attenuator 26 and FET follower stage at the input to the second receiver gain stage 26 to provide a high input and low output impedance source for gating and time varied gain control. The input stage 24 includes a transistor 96, such as a type 2N2222, which operates at a fixed gain, except for a small time varied gain action lasting a few feet at the time of transmission, resulting from the time constant of the base bias filter including capacitor 94 and resistor 95. To prevent tuned transmitter circuit Q and transducer ringing from effectively lengthening the transmitted pulse through the receiver to the point where gating it out would effect minimum range, a fixed TVG is used in the base of the first amplifier stage. This circuitry in combination includes diodes 99a and 99b in series acting as a zener, capacitor 94 and resistor 95, plus emitter resistor 98 and capacitor 101. The transmitted pulse and echoes are applied to the base of transistor 96 through current limiting resistor 22. The negative swing of the voltage is limited to a fixed value of about two volts by the diodes 99a and 99b and capacitor 94 which charges negatively to about 0.5 volts and which acts as a negative bias on the base of transistor 96 by way of the secondary winding of transformer 88. The time constant of capacitor 94 and resistor 95 causes this negative bias to become ineffective after about 5 milliseconds. The large 68 microfarad emitter capacitor 101 operates only as an emitter bypass capacitor. The over-all result of the fixed TVG circuit is that at the output of transistor 96, the transmission pulse is not at the limiting level for more than 10 microseconds longer than the actual direct transmission, normally 80 microseconds. However, the receiver circuitry responds to bottom echoes at 300 microseconds or 0.75 feet. This stage is tuned to 415 kilohertz by means of a slug tuned transformer 100.

The output of amplifier transistor 96 is coupled to attenuator 26 which comprises a 56 thousand ohm serially-connected resistor 29 and shunt diode 30 connected to an FET follower circuit including FET transistor 102, such as a 2N4391, to provide a high impedance source for application of diode controlled gating and TVG application which is applied directly to its input. The second receiver gain stage includes transistor 103, which can be a type 2N2222 is under control of the TVG time varied gain generator 34 and gating that is applied by way of FET transistor 102. Thus, the output of transistor 104 of the second receiver gain stage 28 is controlled by adjustment of the TVG gain control potentiometer of the TVG generator 34 by way of isolation diode 32.

The output of transistor 103 is coupled by the secondary of transformer 104 to a conventional diode detector stage 38 which includes diode 39, which herein is a 1N270, and a 0.02 mfd shunt capacitor 105.

Figure 4D:
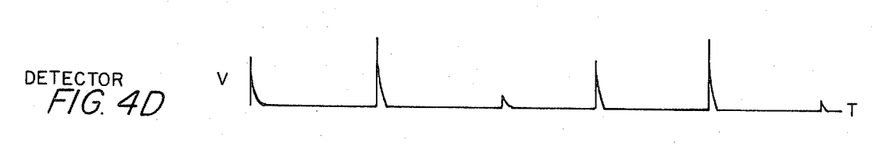
Figure 4E:
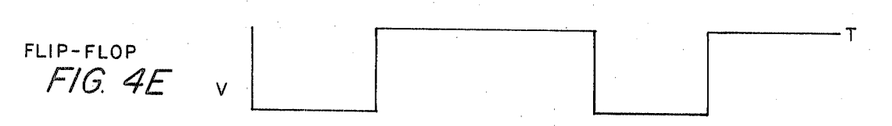

The output of detector diode 39 as shown in FIG. 4D is coupled to flip-flop circuit 40 which acts as a load for the detector 39 and is triggered into one state by a strong negative going pulse from the time base by way of line 41 which overrides any positive transmission pulse fed from the detector 39, at the same time. The conventional flip-flop circuit 40 which includes transistors 106 and 108, such as used in transistor array type CA3086, is triggered into the opposite state by the positive going echo pulse received from the detector. Thus, the negative going discharge portion of time base generator pulse of FIG. 4A, by way of coupling capacitor 43, line 41 and current amplifier 42, overrides any positive transmission pulse from detector 39 and in switching off transistor 106 produces the negative square wave flip-flop output shown in FIG. 4E. At the same time, transistor 108 is placed in the conducting state. This output due to change of state of the flip-flop continues until a positive echo pulse from detector 39, as shown in FIG. 4D, triggers the flip-flop circuit to the opposite state. The length of the flip-flop pulse thus varies with depth. The circuit thus operates as a hard switch with its output going low at the time of transmission, and going high on reception of the first echo return. Accordingly, additional multiple echo returns or noise pulses before the next transmission can have no further effect on the circuit until transistor 106 is again cut off at the next transmission by a negative pulse. The second echo 93 of FIG. 4C, for example, has no effect on circuit operation.

At the time of an echo return there is a positive going square wave of about 7 volts at the collector of transistor 108 which is used to trigger the bottom tracking gate circuit. In the event there should be no echo signals, the negative going cutoff pulse applied to the base of transistor 106 in the presence of some positive pulse from the direct transmission permits the collector of transistor 106 to be driven negative for the approximately 80 microsecond duration of the transmitted pulse. This approximately 80 microsecond pulse appears positive going at the collector of transistor 108, and would trigger the tracking gate multivibrator if not attenuated. To prevent triggering of the tracking gate at transmission, the rise time of the flip-flop output is slowed down to about 500 microseconds in order to attenuate the pulse from transmission in the absence of an echo. This is done by means of capacitor 110 and the further filter and differentiator including capacitor 109, resistor 111, capacitor 113, resistor 115 and capacitor 117, effectively in the input circuit of bottom gate multivibrator 46. At capacitor 117, the differentiated positive trigger spike is about 4.5 volts from the normal flip-flop action from the echo return, and about 1.0 volt from direct transmission in the absence of echo returns. When loaded by the tracking gate multivibrator 46, the triggering level at this point is 2.0 volts, resulting in about 150 microseconds delay in triggering which is taken into account of on the meter calibration in the meter circuit to be described in detail.

Figure 4F:
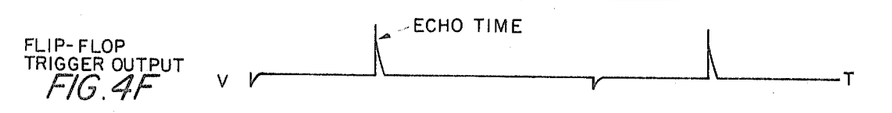

The output from flip-flop 40 thus is differentiated by a 0.1 microfarad capacitor 109 and a shunt 47K ohm resistor 115, resulting in a short pulse at the time of transmission which is clipped by a diode 112 and not used, and a short positive going trigger pulse, as shown in FIG. 4F, at the time of the first echo return that is applied by way of isolating diode 114 to trigger the one-shot multivibrator used for "bottom" gating of the receiver.

Figure 4G:
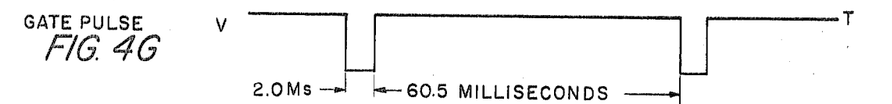

The tracking gate generator 46 used for "bottom" gating of the receiver includes the input transistor 120 and transistors 122 and 124 in a circuit which is basically a high duty cycle one-shot multivibrator which can operate with the aforementioned "on" time of as much as 97 percent. The purpose of the tracking gate is to gate off the receiver at reception of the first echo return and keep it off until approximately 2.0 milliseconds or 4.8 feet of depth before the bottom echo from the next transmission is expected. The transmission repetition rate has been set at 62.5 milliseconds and succeeding bottom echo returns are very close to this distance apart. Thus, the period of the conventional multivibrator is adjusted by gate width potentiometer 126 for a pulse length of 60.5 milliseconds which is a duty cycle of nearly 96 percent. The one-shot pulse thus starts at the time of echo reception, as triggered from the output of the flip-flop circuit by way of diode 114, and continues for 60.5 milliseconds, or 2.0 milliseconds less than the repetition rate of the transmission. The 60.5 millisecond positive going output or gate pulse, representing "off" time is shown in FIG. 4G and is applied to the attenuator 26 by way of line 48 and diode 33 and to diode 30 which acts as a gate in voltage divider resistor 29 and diode 30 to turn the receiver "off" during this period. When no echoes are received, no positive gate pulses are applied to diode 30.

Referring again to FIGS. 3A and 3B there is shown a sample and integrate metering circuit fed by current amplifier 42 which includes transistors 130 and 131 in a Darlington follower circuit to provide a very low output impedance for the sawtooth ramp waveform developed by the time base generator transistor 72. This transistor is provided with a conventional temperature compensating thermistor 71 which compensates for variations in transistor characteristics with changes in ambient temperature. The output waveform time base generator 12 has the required nonlinearity of rise time to provide the desired low range scale expansion when the ramp is sampled linearly with time. The low impedance waveform at the emitter of transistor 131 of the sample and integrate circuit is applied to the collector of a transistor 132 which operates as a sampling switch with the output on its emitter fed to a large integrating capacitor 134 of 200 microfarads and a ground return through a time constant resistor 136 and indicating milliampere meter 66. When a sampling gate pulse is applied to the base of transistor 132 it conducts heavily during the duration of the sample pulse. The meter circuit has two additional series fixed resistors 137 and 138 each equal to the resistance of a single meter. As shown, there are three separate meter terminals so that one, two or three meters can be series connected without requiring a change of calibration settings. A trim potentiometer 140 is part of the series circuit and provides a meter maximum adjustment.

Figure 4H:
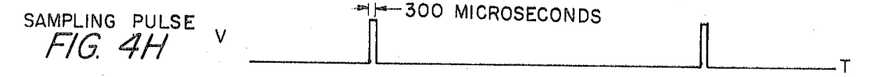
Figure 4I:
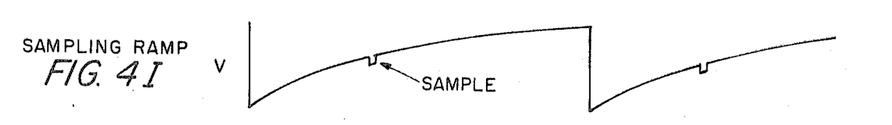
Figure 4J:
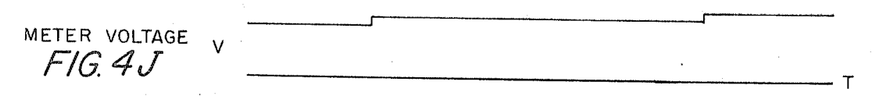

The sampling pulse generator 62 includes transistors 142 and 144 which form a one-shot multivibrator with circuit constants selected to generate a 300 microsecond positive going sampling pulse, as shown at FIG. 4H, at the collector of transistor 144 whenever the base of transistor 142 is triggered from the output on line 49 from the bottom gate multivibrator 46 which the trigger occurring at the time of echo return. This positive going 300 microsecond sampling pulse is applied to the base of transistor 132 in the sample and integrate circuit 64 to turn it on into saturation during the sample pulse, thus charging the integrating capacitor 134 nearly to the value of the ramp voltage at the time of sampling. This result of the sampling pulse applied to the sampling ramp voltage is shown in FIG. 4I at 146 and at 63 in FIG. 1. A number of transmission cycles are required for the sample pulse and transistor 132 to build up the charge voltage on capacitor 134 to a final value in which meter 66 indicates current proportional to the value of the ramp voltage at the time of sampling. This build up of meter voltage is shown in FIG. 4J and varies with depth. Normal variation of sample pulse length between individual units can be readily compensated by the meter maximum adjustment potentiometer 140.

Another input applied to control the second receiver gain stage transistor 103 by way of attenuator 26 is under control of time varied gain so as to reduce receiver sensitivity at shallow ranges and gradually increasing sensitivity to maximum range. Inasmuch as the bottom tracking gate 46 is effective only at depths greater than approximately 4.8 feet, it is desirable to utilize the minimum receiver gain for a given depth of water to substantially eliminate system response to echoes from wakes and debris in the water at shallow depths and to noise generated at the aforementioned speeds in excess of about 25 knots and also to render the equipment much more immune to ignition interference than heretofore. The circuitry is intended to produce proper bottom depth readings in the presence of such wakes, except when the wake is only a few seconds old and completely obscures the bottom echo return. The TVG voltage is applied by way of diodes 31 and 32 and comprises two separate TVG curves or voltages. The first is of higher amplitude and shorter duration and is generated by transistor 148 in transmitter blanking generator circuit 36. The input network of transistor 148 includes resistors 150 and 151 and capacitor 152 which shortens the ramp waveform prior to being inverted by transistor 148. Thus, the transmission pulse is further attenuated by the output of transistor 148 which has a gate length of about 225 microseconds, which is well shorter than the minimum range requirement of 5 or 6 feet, and longer than any transmitted pulse. The blanking pulse or curve is generated by transistor 148 when its base is cut off for approximately 225 microseconds by the negative going discharge of the time base and trigger 12 being applied by way of line 50 and capacitor 152 to the base of transistor 148. This generates a positive going blanking pulse, which can be considered a portion of the TVG signal, at the collector of transistor 148 which is applied through resistor 154 and diode 31 to diode 30 which operates as a diode gate to the signal coming through attenuator resistor 29 from the first receiver stage. Thus, after final amplification by second receiver gain stage 28, the direct transmission for signals in the range of less than 0.75 feet is attenuated well below the limiting level at the detector 39, with its length no longer than the direct transmission.

Time varied gain is also generated by TVG generator 34 which includes the circuitry of transistor 156 which generates a second longer curve of less amplitude. The circuitry for generating this second longer curve of less amplitude than the output of blanking generator 36 is provided with a trim potentiometer 158 for adjusting the TVG to the required value of voltage in conjunction with capacitor 159. The effect of the two separate output voltage curves for transistors 148 and 156 are combined by the voltage divider resistor 29 in conjunction with the changing conduction of diode 30 at the input to FET transistor 102. Thus, the dynamic attenuator circuit 26 effectively combines first, the output of the bottom tracking gate which permits high transmitter power to insure strong bottom echo returns, and second, the use of transmitter blanking and time varied gain which greatly reduces the possibility of locking on undesired echo returns, while the method of sampling the ramp voltage permits the meter to drop to zero in the absence of echo returns. This combination of automatic control voltages, as combined in attenuator 26, eliminates the necessity for manual sensitivity adjustments and contributes to safety of operation of marine craft.

This completes the description of the preferred embodiment of the invention. However, many modifications thereof will be apparent to persons skilled in the art without departing from the spirit and scope of this invention. Accordingly, it is desired that this invention be not limited by the particular details of the species of the invention disclosed herein, except as defined by the appended claims.

I claim:

1. An echo pulse ranging depth meter for reading the depth to the bottom of a body of water comprising a transmitter for producing regularly recurring pulses, a receiver including an automatic attenuation circuit and a flip-flop circuit having two stable states, first means in conjunction with said automatic attenuation circuit for providing a first control signal to vary the gain of said receiver from a relatively low value at the time of transmission of a regularly recurring pulse to a relatively high value at a maximum depth range, second means in conjunction with said automatic attenuation circuit operating in response to reception of a first recurring echo pulse from the bottom of said body of water to provide a second control signal to actuate said attenuation circuit to block return echoes from intermediate ranges from said bottom until a predetermined time prior to reception of another of said recurring echo pulses from said bottom, third means in conjunction with said attenuation circuit to provide a third control signal for eliminating from said receiver at a minimum range undesired regularly recurring pulses from said transmitter means in response to a series of recurring echo pulses from said bottom to alter the state of said flip-flop circuit, and means for measuring the portion of time said flip-flop circuit is in one of said stable states.

2. In the depth meter of claim 1, said attenuation circuit including a voltage divider comprising resistance means and semiconductor means connected in series, and means for dynamically changing the bias on said semiconductor means in response to a signal representing the composite outputs of said first, second and third control signals, thereby to attenuate signals passing through said receiver in proportion to the combination of the outputs of said first, second and third control signals.

3. In the depth meter of claim 1, said means for measuring the portion of time said flip-flop circuit is in one of said stable states includes means in the absence of a recurring echo pulse to prevent actuation of said measurement means.

4. An echo pulse ranging depth meter for reading the depth of a body of water comprising a transmitter for producing regularly recurring pulses, a receiver including an automatic attenuation circuit, first means coupled to said attenuation circuit for automatically varying the gain of said receiver from a relatively low value at the time of transmission of a regularly recurring pulse to a relatively high value at a maximum depth range, second means in response to reception of a first recurring echo pulse from the bottom of said body of water to actuate said attenuation circuit in conjunction with said first means to block return echoes from intermediate ranges from said bottom until a predetermined time prior to reception of another of said recurring echo pulses from said bottom, means in response to a series of recurring echo pulses from said bottom to provide a meter indication of a ramp voltage representative of the portion of time from a regularly recurring pulse produced by said transmitter to the reception of a corresponding one of said recurring echo pulses from said bottom.

5. An echo pulse ranging depth meter for reading the depth of a body of water comprising a transmitter for producing regularly recurring pulses, a receiver including an attenuator circuit and a flip-flop circuit having two stable states, means in response to reception of a first recurring echo pulse from the bottom of said body of water to energize said attenuation circuit to block return echoes from intermediate ranges from said bottom until a predetermined time prior to reception of another of said recurring echo pulses from said bottom, means in response to a series of recurring echo pulses from said bottom to alter the state of said flip-flop circuit, means for measuring the portion of time said flip-flop is in one of said stable states, said latter means including means in the absence of a recurring echo pulse of said series to prevent actuation of said measurement means.

6. In combination, a depth meter, means for transmitting pulses and receiving echoes, means for increasing the sensitivity of said receiving means with an increase in depth, means for attenuating received echoes except during a prdetermined period prior to the reception of a recurring echo means for generating at the time of transmission of a pulse a ramp voltage the amplitude of which increases with depth in a nonlinear manner, means in conjunction with said means for receiving echoes for measuring, at the time of return of an echo, the amplitude of a sample of said ramp voltage, said latter means providing for reading of said depth meter in the presence of relatively high pulse powers together with the suppression of spurious intermediate range echoes.

7. An echo pulse ranging depth meter for reading the depth of a body of water comprising a transmitter for producing regularly recurring pulses, a receiver including an automatic attenuator circuit and a flip-flop circuit adapted to change its state in response to a first received echo pulse gated through said attenuator circuit, a bottom gating circuit providing in response to a change of state of said flip-flop circuit a control signal to alter said attenuator circuit to block return echo pulses from ranges less than said first received echo pulse until a predetermined time prior to reception of another of said received echo pulses, and a meter circuit including a nonlinear ramp voltage generator adapted to indicate the depth of said body of water by measuring the ramp voltage only during the return time of said received echo pulses.

8. An echo ranging pulse depth meter, a transmitter for producing regularly recurring pulses, a receiver including an attenuator and a flip-flop circuit, said receiver including means for coupling said transmitter pulses to condition said flip-flop in a first stability condition, said flip-flop responsive to a series of reflected echo pulses by way of said attenuator to alter the stability condition of said flip-flop, gating means in response to a change in condition of said flip-flop to actuate said attenuator to block subsequent echo pulses until a predetermined period prior to the time of another series of reflected echo pulses, said attenuator adapted to attenuate both transmitted and received pulses, an amplification stage in circuit with said receiver for amplifying without attenuation both transmitted and received pulses, and meter means for measuring the elapsed time between a transmitted pulse and a corresponding reflected echo pulse.

9. In the depth meter of claim 8, said meter means including a ramp voltage initiated at the time of said transmitted pulse and means for measuring the amplitude of a sample of said ramp voltage at the time of said reflected echo pulse.

10. The depth meter of claim 8 in which the ramp voltage initiated at the time of said transmitted pulse is nonlinear.

11. A pulse type depth meter comprising means for transmitting regularly recurring pulses and receiving reflected echo pulses, an automatic attenuator circuit adapted to attenuate both transmitted pulses and reflected echo pulses, a bistable flip-flop circuit adapted to assume a first stable state in response to signals received from said attenuator circuit and to assume another stable state in response to other signals used for initiating the means for transmitting regularly recurring pulses, gating means in response to a change in one of the stable states of said flip-flop to provide a control signal to actuate said attenuator circuit to block subsequent reflected echo pulses until a preset time prior to the time of another of said regularly recurring pulses, a ramp circuit actuated by a control signal from said other signals used to actuate said transmitting means to provide an output signal having an amplitude which corresponds to the time of arrival of a sample signal from said gating means, and a meter for measuring the amplitude of said output signal.

12. In the depth meter of claim 11, said receiving means including an amplification stage for receiving both transmitting pulses and reflected echo pulses and biasing means connected to said amplification stage for amplifying without attenuation both received transmitting pulses and reflected echo pulses.

13. In the echo pulse range meter of claim 11, a blanking circuit coupled to said attenuating circuit for blocking signals at extremely short ranges including signals due to recurring pulses from said transmitting means.

14. An echo pulse range meter comprising transmitting means for producing regularly recurring pulses, synchronizing means for triggering said transmitting means, a receiver coupled to said synchronizing means and including an attenuating circuit, a flip-flop having two stable states in circuit with said attenuating circuit, means coupled to said attenuating circuit for varying the gain of said receiver from a relatively low value at the time of transmission of one of said regularly recurring pulses to a relatively high value at maximum range, means in response to reception of a first regularly recurring echo pulse to actuate said attenuating circuit to block return echo pulses from intermediate ranges until a preset time prior to reception of a second of said regularly recurring echo pulses corresponding approximately to the range of said first regularly recurring echo pulse, means in response to said second of said regularly recurring echo pulses to alter the state of said flip-flop, means in response to said synchronizing means for generating a ramp voltage the amplitude of which increases in a nonlinear manner, and means in response to a change in state of said flip-flop for providing a meter indication of the amplitude of said ramp voltage which corresponds to the time of reception of said second of said regularly recurring echo pulses.

15. In combination, a depth meter circuit including a depth meter, means for transmitting pulses and means for receiving reflected echo pulses, an attenuation circuit coupled to said receiving means and adapted to provide attenuation for signals passing through said receiving means in a manner representative of the combination of three signals applied to corresponding input terminals of said attenuation circuit, means operative at the time of a transmitting pulse for applying a minimum range blanking signal to a first of said three input terminals, means in response to reception of a reflected echo pulse to provide an intermediate range blanking signal to a second of said three input terminals to block from passing through said receiver return echoes from intermediate ranges until a predetermined time prior to reception of another of said reflected echo pulses, means for applying a control signal to a third of said terminals for varying the gain of said receiving means from a relatively low value at the time of transmitting pulses to a relatively high value at maximum range, said depth meter circuit including nonlinear measuring means for providing a depth indication on said depth meter in the presence of spurious intermediate range echoes.

* * * * *